United States Patent
Kotchaplayuk et al.

(10) Patent No.: US 11,900,974 B2
(45) Date of Patent: Feb. 13, 2024

(54) HARD DRIVE FLEXURE INCLUDING A TRACE OVERLAPPING A BASE LAYER FEATURE

(71) Applicant: Magnecomp Corporation, Murrieta, CA (US)

(72) Inventors: Treesoon Kotchaplayuk, Wangnoi (TH); Johnathan Hy-tho Phu, San Gabriel, CA (US); Kuen Chee Ee, Chino, CA (US); David Glaess, Bangkok (TH); Rakkiet Warinsirirux, Wangnoi (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 17/883,208

(22) Filed: Aug. 8, 2022

(65) Prior Publication Data
US 2023/0066373 A1     Mar. 2, 2023

Related U.S. Application Data

(60) Provisional application No. 63/232,064, filed on Aug. 11, 2021.

(51) Int. Cl.
*G11B 5/48* (2006.01)
(52) U.S. Cl.
CPC .......... *G11B 5/4853* (2013.01); *G11B 5/4833* (2013.01)
(58) Field of Classification Search
CPC .............................. G11B 5/4853; G11B 5/4833
See application file for complete search history.

(56) References Cited

U.S. PATENT DOCUMENTS

| | | | | |
|---|---|---|---|---|
| 6,741,426 B2 * | 5/2004 | Girard | ................. | G11B 5/4853 360/245.9 |
| 6,965,499 B1 * | 11/2005 | Zhang | ................. | G11B 5/4853 360/234.8 |
| 8,427,783 B2 | 4/2013 | Tsuchiya et al. | | |
| 8,446,695 B1 * | 5/2013 | Ee | ........................ | G11B 5/4826 360/245.9 |
| 8,605,389 B1 * | 12/2013 | Pan | ....................... | G11B 5/486 360/245.9 |
| 8,947,831 B1 | 2/2015 | Ee et al. | | |

(Continued)

OTHER PUBLICATIONS

International Search Report and Written Opinion in International Application No. PCT/US2022/039882, dated Dec. 28, 2022.

*Primary Examiner* — Brian E Miller
(74) *Attorney, Agent, or Firm* — DLA Piper LLP (US)

(57) ABSTRACT

A flexure is described, which includes conductive traces extending from a proximal end of the flexure to a distal end of the flexure. The flexure also includes a plurality of outer gimbal struts configured to define an opening at the proximal end of the flexure. The flexure also includes an oblong feature extending into the opening, the oblong feature defines an aperture. The conductive traces include a first semi-circular conductive trace portion overlapping a first section of the oblong feature at a proximal end of the aperture extending to a distal end of the aperture. The conductive traces include a second semi-circular conductive trace portion overlapping a second section of the oblong feature at a proximal end of the aperture extending to the distal end of the aperture. The first and second semi-circular conductive trace portions define the aperture.

21 Claims, 10 Drawing Sheets

(56) References Cited

U.S. PATENT DOCUMENTS

| | | | |
|---|---|---|---|
| 9,025,282 B1 | 5/2015 | Miller | |
| 9,117,466 B2 | 8/2015 | Takikawa et al. | |
| 9,129,624 B1 * | 9/2015 | Hahn | G11B 5/53 |
| 10,839,835 B2 * | 11/2020 | Hahn | G11B 5/4833 |
| 10,957,349 B2 * | 3/2021 | Pokornowski | G11B 5/4853 |
| 2007/0297094 A1 * | 12/2007 | Sassine | H05K 1/118 |
| | | | 360/245.9 |
| 2011/0090600 A1 * | 4/2011 | Feng | G11B 5/4833 |
| | | | 360/245.3 |
| 2014/0085755 A1 * | 3/2014 | Hanya | G11B 5/483 |
| | | | 360/244.5 |
| 2015/0055253 A1 * | 2/2015 | Takikawa | G11B 5/4826 |
| | | | 360/246.2 |
| 2018/0040343 A1 | 2/2018 | Ee et al. | |
| 2019/0221231 A1 | 7/2019 | Hahn et al. | |
| 2020/0372930 A1 | 11/2020 | Ee et al. | |
| 2022/0122633 A1 * | 4/2022 | Zhang | G11B 5/4826 |
| 2022/0358960 A1 * | 11/2022 | Ee | G11B 5/596 |
| 2023/0066373 A1 * | 3/2023 | Kotchaplayuk | G11B 5/4853 |
| 2023/0128010 A1 * | 4/2023 | Phu | G11B 5/4833 |
| | | | 360/245.3 |

\* cited by examiner

Distal End

Proximal End

HARD DRIVE FLEXURE INCLUDING A TRACE OVERLAPPING A BASE LAYER FEATURE

CROSS-REFERENCE TO RELATED APPLICATIONS

This application claims the benefit of, and priority to, U.S. Provisional Application No. 63/232,064, filed on Aug. 11, 2021, which is hereby incorporated by reference in its entirety.

FIELD

This disclosure relates to the field of suspensions for hard disk drives. More particularly, this disclosure relates to the field of flexures for suspensions.

DESCRIPTION OF RELATED ART

Magnetic hard disk drives and other types of spinning media drives such as optical disk drives are well known. A typical disk drive unit includes a spinning magnetic disk containing a pattern of magnetic storage medium ones and zeroes on it that constitutes the data stored on the disk drive. The magnetic disk is driven by a drive motor. The disk drive unit further includes a disk drive suspension to which a magnetic read/write is mounted proximate a distal end of load beam. The proximal end of a suspension or load beam is the end that is supported, i.e., the end nearest to the baseplate which is swaged or otherwise mounted to an actuator arm. The distal end of a suspension or load beam is the end that is opposite the proximal end, i.e., the distal end is the cantilevered end.

The suspension is coupled to an actuator arm, which in turn is coupled to a voice coil motor that moves the suspension arcuately in order to position the head slider over the correct data track on the data disk. The head slider is carried on a gimbal which allows the slider to pitch and roll so that it follows the proper data track on the disk, allowing for such variations as vibrations of the disk, inertial events such as bumping, and irregularities in the disk's surface.

In a single stage actuated suspension, only the voice coil motor moves the suspension. In a dual stage actuated (DSA) suspension a small actuator located on the suspension moves the head slider in order to position the head slider over the correct data track. The actuator provides both finer positioning of the head slider than does the voice coil motor and provides higher servo bandwidth than does the voice coil motor. The actuator may be in various locations on the suspension depending on the DSA suspension design. Actuators used in DSA suspension have been called milli-actuators or microactuators.

SUMMARY

A flexure is described, which includes conductive traces extending from a proximal end of the flexure to a distal end of the flexure. The flexure also includes a plurality of outer gimbal struts configured to define an opening at the proximal end of the flexure. The flexure also includes an oblong circular feature extending into the opening, the oblong circular feature defines an aperture. The conductive traces include a first semi-circular conductive trace portion overlapping a first section of the oblong circular feature at a proximal end of the aperture extending to a distal end of the aperture. The conductive traces include a second semi-circular conductive trace portion overlapping a second section of the oblong circular feature at a proximal end of the aperture extending to the distal end of the aperture. The first and second semi-circular conductive trace portions define the aperture.

In some examples of the flexure, each outer gimbal strut is connected to a bridge strut, the bridge strut configured to provide support to a portion of the conductive traces. Moreover, the second section of the oblong circular feature is opposite the first section of the oblong circular feature. In some examples of the flexure, the conductive traces includes integrated electrical leads formed of copper. In alternative examples of the flexure, the conductive traces include a first insulating material layer, coppery alloy signal conductors positioned on the first insulating material layer, and an insulating and protective covercoat layer over the coppery alloy signal conductors.

In some examples of the flexure, the flexure further includes a base formed of stainless steel. The oblong circular feature may be a part of the base. The conductive traces are insulated from the stainless steel using a dielectric layer. The flexure may also include a head slider at a slider tongue. The conductive traces and the oblong circular feature provide a reinforced support structure for a head slider at a slider tongue.

A suspension is described, which includes a flexure. The flexure includes conductive traces extending from a proximal end of the flexure to a distal end of the flexure. The flexure also includes a plurality of outer gimbal struts configured to define an opening at the proximal end of the flexure. The flexure also includes an oblong circular feature extending into the opening, the oblong circular feature defines an aperture. The conductive traces include a first semi-circular conductive trace portion overlapping a first section of the oblong circular feature at a proximal end of the aperture extending to a distal end of the aperture. The conductive traces include a second semi-circular conductive trace portion overlapping a second section of the oblong circular feature at a proximal end of the aperture extending to the distal end of the aperture. The first and second semi-circular conductive trace portions define the aperture.

In some examples of the suspension, each outer gimbal strut is connected to a bridge strut, the bridge strut configured to provide support to a portion of the conductive traces. Moreover, the second section of the oblong circular feature is opposite the first section of the oblong circular feature. In some examples of the suspension, the conductive traces includes integrated electrical leads formed of copper. In alternative examples of the suspension, the conductive traces include a first insulating material layer, coppery alloy signal conductors positioned on the first insulating material layer, and an insulating and protective covercoat layer over the coppery alloy signal conductors.

In some examples of the suspension, the suspension further includes a base formed of stainless steel. The oblong circular feature may be a part of the base. The conductive traces are insulated from the stainless steel using a dielectric layer. The suspension may also include a head slider at a slider tongue. The conductive traces and the oblong circular feature provide a reinforced support structure for a head slider at a slider tongue.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure and are therefore not to be considered as limiting of its scope. The principles are described and explained with additional specificity and detail using the following drawings.

DETAILED DESCRIPTION

Figure 1:
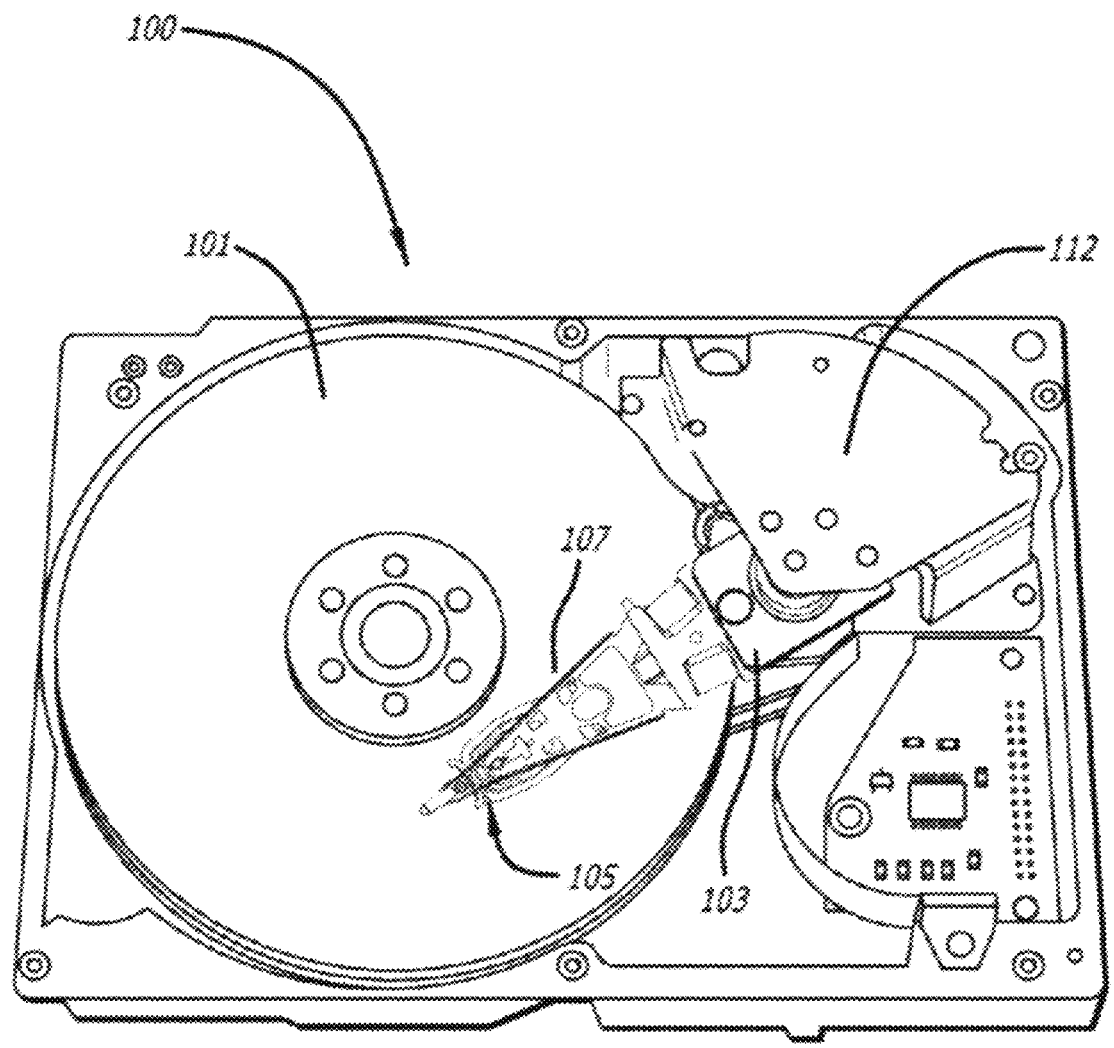
FIG. 1 illustrates a top perspective view of a magnetic hard disk drive, in accordance with an example of the disclosure.

FIG. 1 illustrates a top perspective view of an exemplary hard disk drive 100 and suspension device. The hard disk drive 100 includes a spinning magnetic disk 101 containing a pattern of magnetic ones and zeroes on it that constitutes the data stored on the disk drive. The magnetic disk is driven by a drive motor. The disk drive 100 further includes a suspension 105 to which a head slider, such as a magnetic head slider, is mounted proximate the distal end of load beam 107. The proximal end of a suspension or load beam 107 is the end that is supported, i.e., the end nearest to a base plate which is swaged or otherwise mounted to an actuator arm. The distal end of a suspension or load beam is the end that is opposite the proximal end, i.e., the distal end is the cantilevered end.

Suspension 105 is coupled to an actuator arm 103, which in turn is coupled to a voice coil motor 112 that moves the suspension 105 arcuately in order to position the head slider over the correct data track on data disk 101. The head slider is carried on a gimbal which allows the slider to pitch and roll so that it follows the proper data track on the spinning disk, allowing for such variations as vibrations of the disk, inertial events such as bumping, and irregularities in the disk's surface.

In addition to a voice coil motor 112 which moves the entire suspension, some example suspensions include an additional microactuator located on the suspension to effect fine movements of the magnetic head slider and to keep it properly aligned over the data track on the spinning disk. The microactuator(s) provide finer control and much higher bandwidth of the servo control loop than does the voice coil motor alone, which only effects relatively coarse movements of the suspension and hence the magnetic head slider. A piezoelectric element, sometimes referred to simply as a PZT, is often used as the microactuator motor, although other types of microactuator motors are possible.

Figure 2:
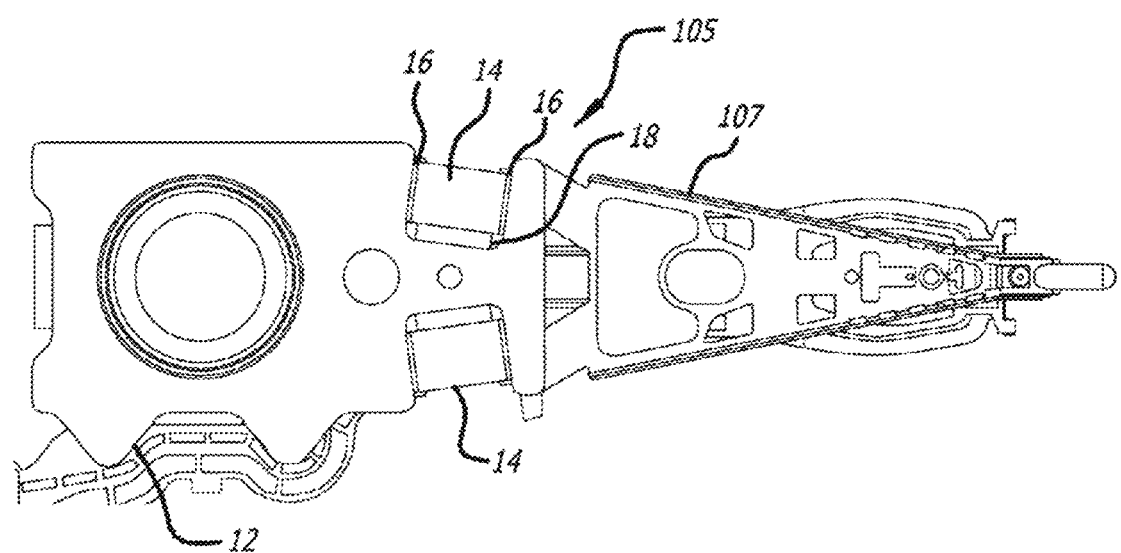
FIG. 2 illustrates a top plan view of the suspension of the disk drive of FIG. 1, in accordance with an example of the disclosure.

FIG. 2 illustrates a top plan view of the suspension 105 in FIG. 1. Two PZT microactuators 14 can be affixed to suspension 105 on microactuator mounting shelves 18 that are formed within base plate 12, such that the PZTs span respective gaps in base plate 12. Microactuators 14 are affixed to mounting shelves 18 by epoxy 16 at each end of the microactuators. The positive and negative electrical connections can be made from the PZTs to the suspension's flexible wiring trace and/or to the plate by a variety of techniques. When microactuator 14 is activated, it expands or contracts and thus changes the length of the gap between the mounting shelves thereby producing fine movements of the read/write head that is mounted at the distal end of suspension 105.

The suspension 105 includes base plate 12, load beam 107, a flexure welded or otherwise affixed to the load beam 107, and magnetic read/write head slider affixed to the distal and gimbaled portion of flexure.

Figure 3:
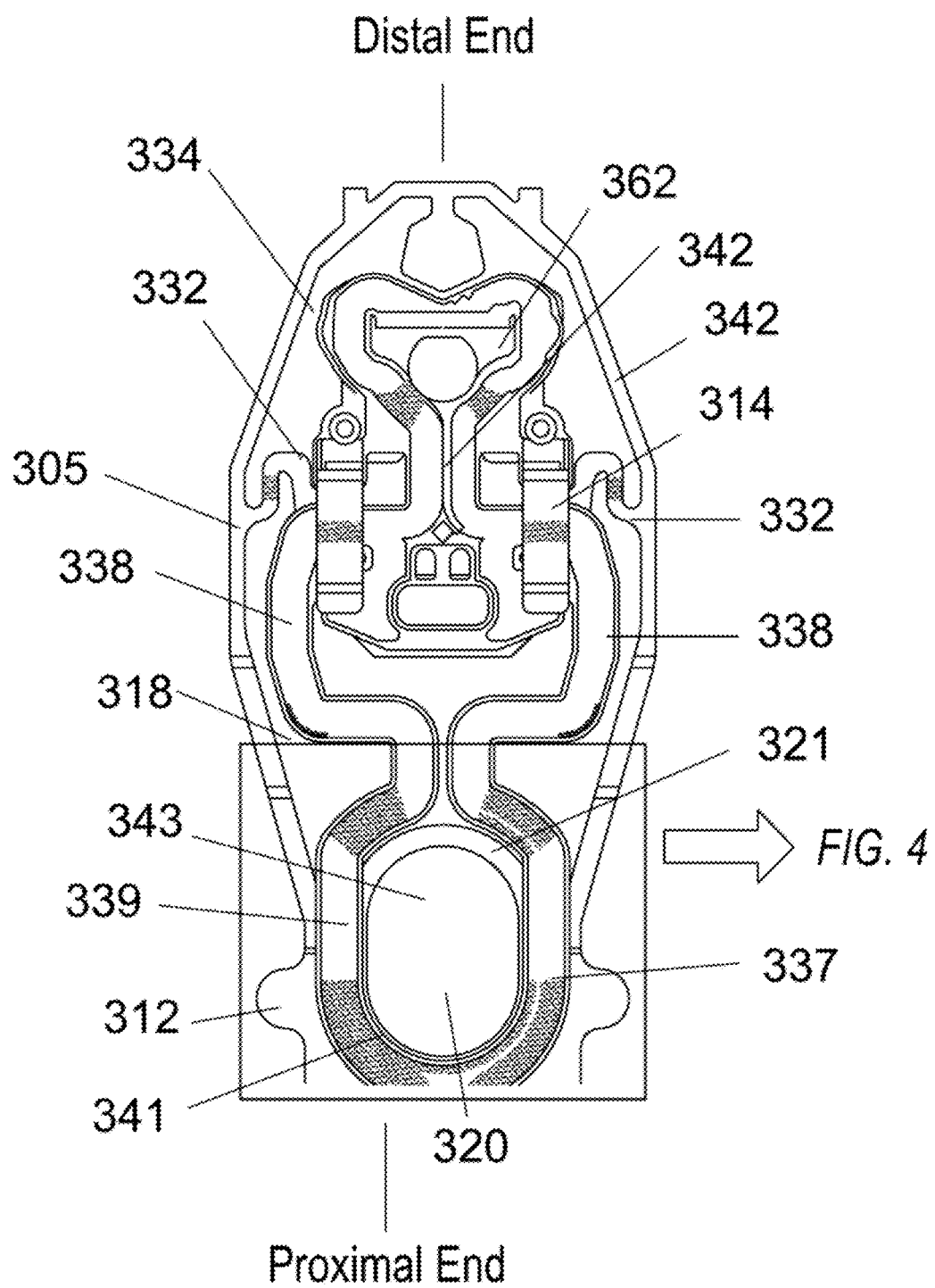
FIG. 3 illustrates a top plan view of a suspension flexure, in accordance with an example of the disclosure.

FIG. 3 illustrates a top plan view of a flexure 305 of a suspension, in accordance with an example of the disclosure, viewed from as the gimbal top. Flexure 305 typically includes a non-gimbaled portion or rigid base 312. The flexure 305 also includes a gimbaled portion that includes a slider tongue 362 to which a magnetic read/write head slider can be attached. The flexure 305 also include a flexible electrical circuit or conductive traces 338. The conductive traces 338 extend from a proximal end of the flexure to the distal end of the flexure. This is discussed in greater detail below.

The gimbal structure allows the gimbaled portion including slider tongue 362 to pitch and roll freely in response to surface irregularities in the data disk as the disk spins underneath slider. The slider is supported for rotational movement in 3 degrees (pitch, roll, and yaw) by a dimple in load beam, at a dimple location 342. In the illustrative example shown, the gimbal takes the form of a ring gimbal including outer gimbal struts, or simply outer struts, 334. The flexure 305 also includes bridge struts 332, which extend from the outer gimbal struts 334 to provide support to a portion of the conductive traces 338.

The conductive traces 338 extend from the bridge struts 332 over an opening 318 to the base 312 at the proximal end. The base 312 includes an oblong circular feature 321 extending into the opening 318, the oblong circular feature 321 defines an aperture 320. The conductive traces 338 include a first semi-circular conductive trace portion 339 and a second semi-circular conductive trace portion 337. The first semi-circular conductive trace portion 339 overlaps the oblong circular feature 321 at a proximal end of the aperture 341 to further define the aperture 320. The first semi-circular conductive trace portion 339 does not overlap the oblong circular feature 321 at a distal end of the aperture 343, but rather extends into the opening 318. Similarly, the second semi-circular conductive trace portion 337 overlaps the oblong circular feature 321 at a distal end of the aperture 341 to further define the aperture 320. The second semi-circular conductive trace portion 337 does not overlap the oblong circular feature 321 at a distal end of the aperture 343, but rather extends into the opening 318.

Figure 4:
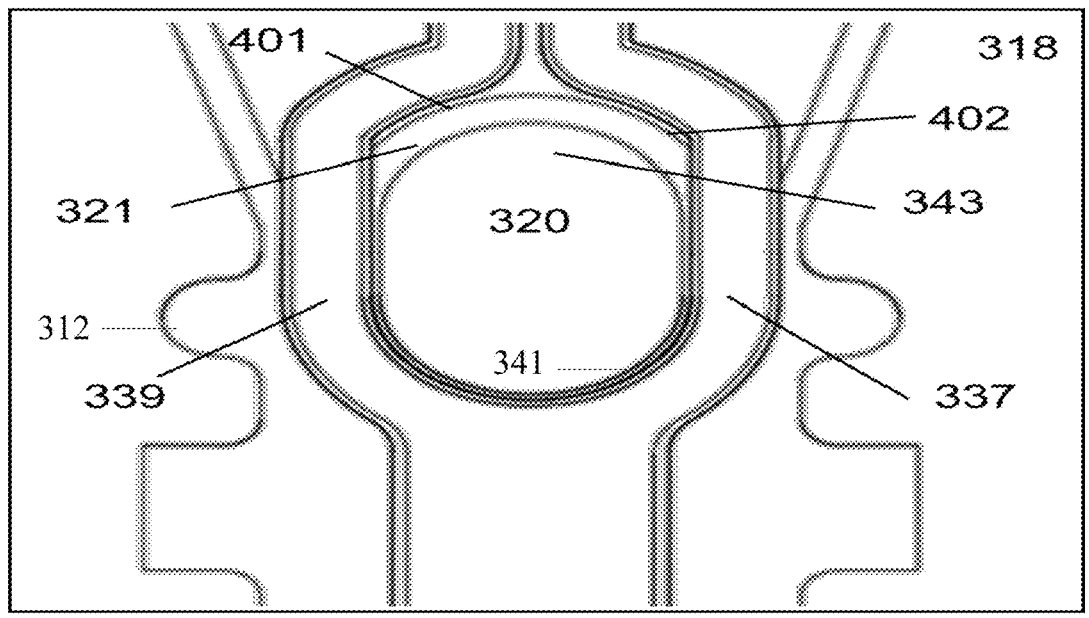
FIG. 4 illustrates a close-up view of the suspension flexure of FIG. 3, in accordance with an example of the disclosure.

FIG. 4 illustrates a close-up view of the flexure 305 of FIG. 3, in accordance with an example of the disclosure. As indicated above, the first semi-circular conductive trace portion 339 does not overlap the oblong circular feature 321 at a distal end of the aperture 343, but rather extends into the opening 318. Thus, a first gap 401 is created between the oblong circular feature 321 and the first semi-circular conductive trace portion 339. Furthermore, the second semi-circular conductive trace portion 337 does not overlap the oblong circular feature 321 at a distal end of the aperture 343, but rather extends into the opening 318. Thus, a second gap 402 is created between the oblong circular feature 321 and the first semi-circular conductive trace portion 339.

Figure 5:
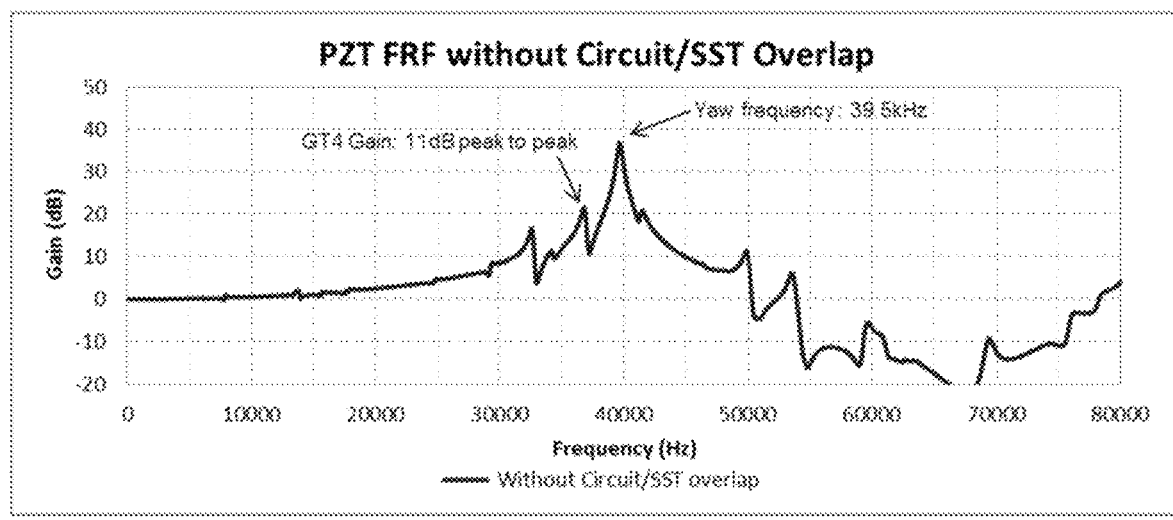
FIG. 5 illustrates a graph of the PZT frequency response function of the suspension flexure according to an embodiment such as illustrated in FIG. 3.

FIG. 5 illustrates a graph of the PZT frequency response function of the suspension flexure according to an embodiment such as illustrated in FIG. 3. The suspension exhibited higher order gimbal torsion mode gain of about 11 dB peak to peak and yaw frequency of about 39.5 kHz.

Figure 6:
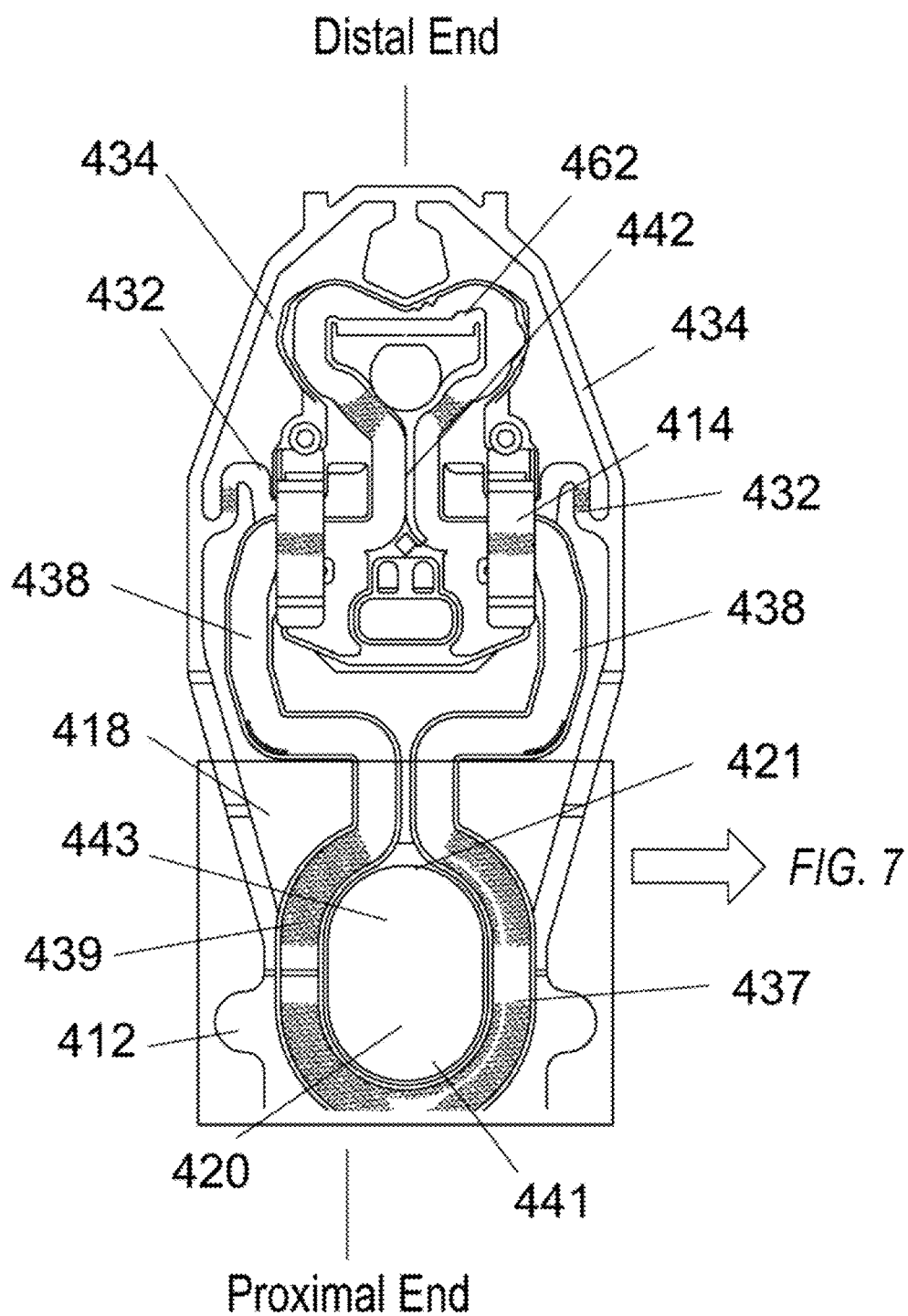
FIG. 6 illustrates a top plan view of a suspension flexure, in accordance with an alternative example of the disclosure.

FIG. 6 illustrates a top plan view of a flexure 405 of a suspension, in accordance with an example of the disclosure, viewed from the gimbal top. Flexure 405 includes a non-gimbaled portion or rigid base 412 and a gimbaled portion. The gimbaled portion includes a microactuator 414 and a slider tongue 462 to which a magnetic read/write head slider can be attached. The flexure 405 is made of stainless steel. The gimbaled portion are also made of stainless steel, for example.

The flexure 405 can also include a flexible electrical circuit or conductive traces 438. The conductive traces 438 can extend from a proximal end of the flexure to the distal end of the flexure. This is discussed in greater detail below.

The gimbal structure allows the gimbaled portion including slider tongue 462 to pitch and roll freely in response to surface irregularities in the data disk as the disk spins underneath slider. The slider is supported for rotational movement in 3 degrees (pitch, roll, and yaw) by a dimple in load beam, at a dimple location 442. A number of various gimbal designs exist and are commercially used; in the illustrative example shown, the gimbal takes the form of a ring gimbal including outer gimbal struts, or simply outer struts, 434. The flexure 405 also includes bridge struts 432, which extend from the outer gimbal struts 434 to provide support to a portion of the conductive traces 438.

The conductive traces 438 extend from the bridge struts 432 over an opening 418 to the base 412 at the proximal end. The base 412 includes an oblong circular feature 421 extending into the opening 418, the oblong circular feature 421 defines an aperture 420. The conductive traces 438 include a first semi-circular conductive trace portion 439 and a second semi-circular conductive trace portion 437. The first semi-circular conductive trace portion 439 overlaps a first section of the oblong circular feature 421 at a proximal end of the aperture 441 and at a distal end of the aperture 443 to define the aperture 420. Similarly, the second semi-circular conductive trace portion 437 overlaps a second section of the oblong circular feature 421 at a proximal end of the aperture 441 and at a distal end of the aperture 443 to define the aperture 420. The second section of the oblong circular feature 421 is opposite the first section of the oblong circular feature 421.

The conductive traces 438 includes integrated electrical leads that may be formed of copper and/or other electrically conductive material. Alternatively, the conductive traces 438 can include layers of an insulating material such as polyimide, coppery alloy signal conductors on top of the polyimide, and an insulating and protective covercoat such as another insulative layer of polyimide over the copper signal conductors. The base 412, including the oblong circular feature 421 can be formed of stainless steel or other resilient material layer. The conductive traces 438 can be insulated from the stainless steel using a dielectric layer or other insulating material layer. The conductive traces 438 and the stainless-steel oblong circular feature 421 together provide a reinforced support structure for the head slider at the slider tongue 462. In some examples, a cover layer may be provided over the conductive traces 438.

Figure 7:
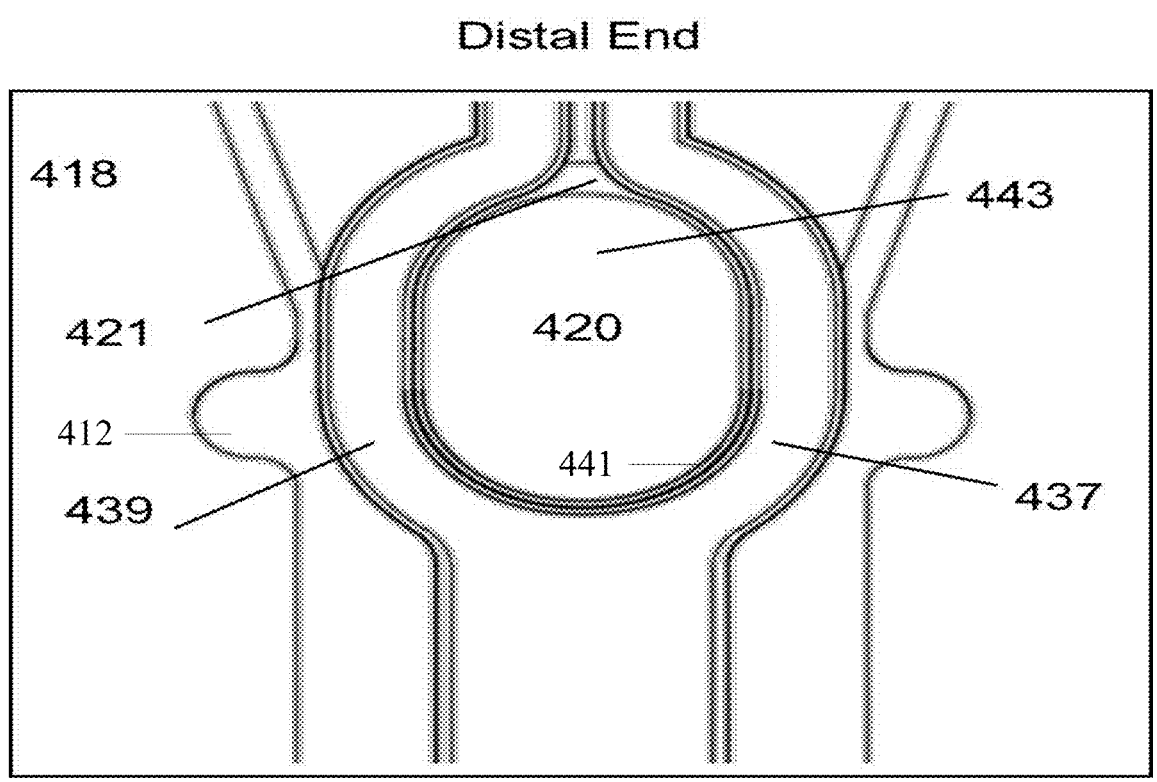
FIG. 7 illustrates a close-up view of the suspension flexure of FIG. 6, in accordance with an example of the disclosure.

FIG. 7 illustrates a close-up view of the flexure 405 of a suspension 400 of FIG. 6, in accordance with an example of the disclosure. As indicated above, the first and second semi-circular conductive trace portions 439, 437 overlaps the oblong circular feature 421 at the proximal and distal ends of the aperture, eliminating a gap between the oblong circular feature 421 and the conductive trace portions. The first and second semi-circular conductive trace portions 439, 437 extend into the opening 418 once the aperture is defined. Thus, the first and second semi-circular conductive trace portions 439, 437 overlapping the oblong circular feature 421 improves a PZT frequency response function of the flexure 405 of a suspension 400, according to an embodiment.

Figure 8A:
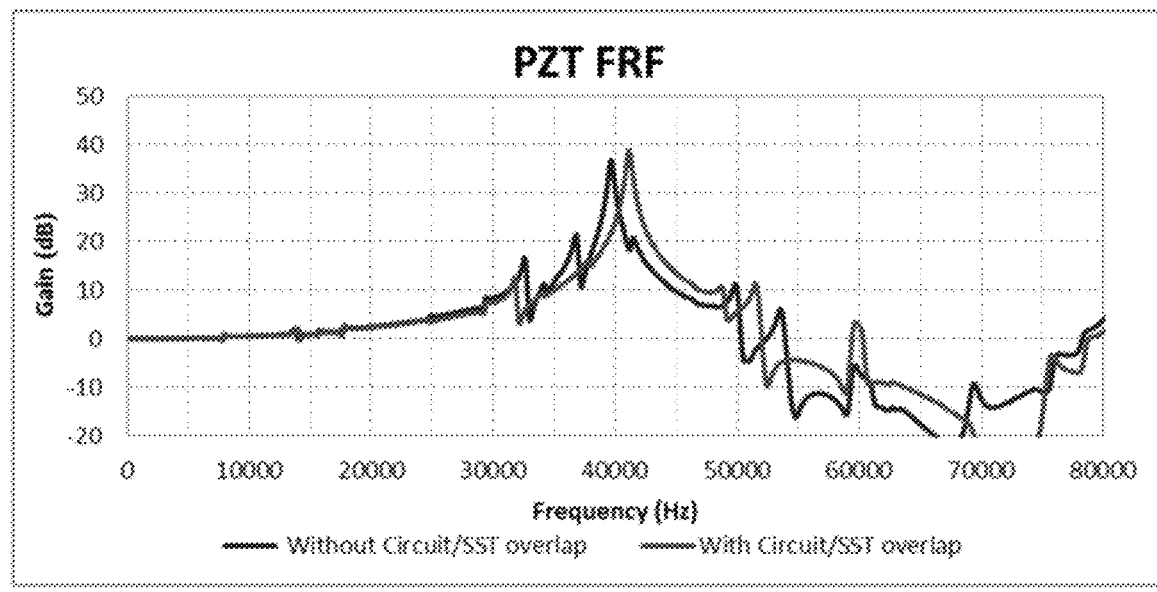
FIGS. 8A and 8B illustrate graphs of the PZT frequency response function of the suspension flexure according to an embodiment such as illustrated in FIG. 6.
Figure 8B:
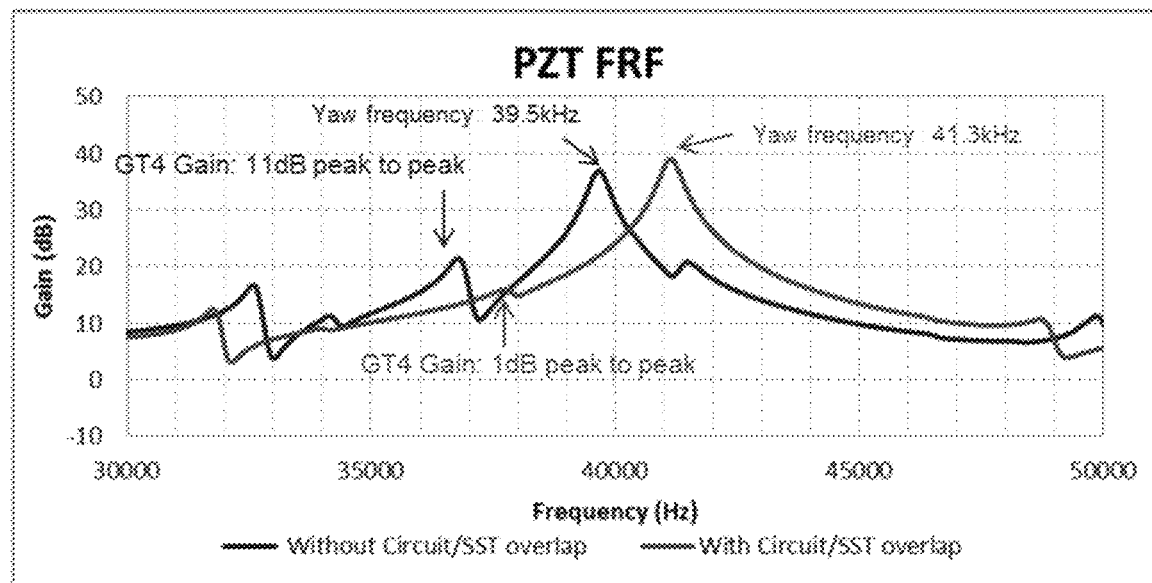

FIGS. 8A and 8B illustrate graphs of the PZT frequency response function of the suspension flexure according to an embodiment such as illustrated in FIG. 6. The suspension exhibited high order gimbal torsion mode gain of about 1 dB peak to peak and yaw frequency of about 41.3 kHz. The suspension exhibited reduced high order gimbal torsion mode gain of about 10 dB and Yaw frequency increase of about 1.8 kHz as compared to the simulation exhibited in FIG. 5. These are advantageous in increasing head positioning control loop bandwidth, which translates into both lower data seek times and lower susceptibility to vibrations.

Figure 9A:
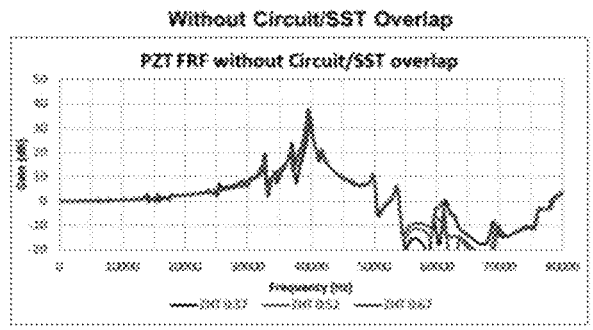
FIGS. 9A-9F illustrate graphs of the PZT frequency response function of a suspension according to an embodiment such as illustrated in FIG. 3 compared to the suspension according to an embodiment such as illustrated in FIG. 6.
Figure 9B:
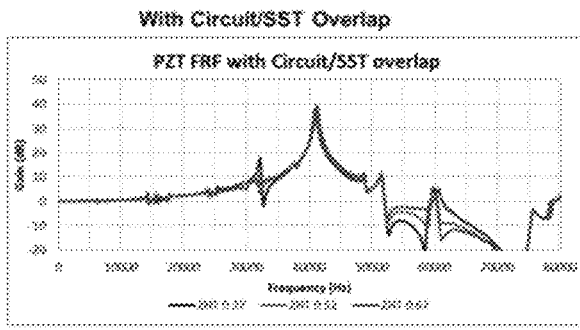
Figure 9C:
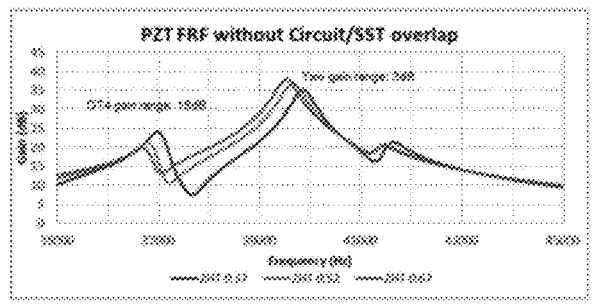
Figure 9D:
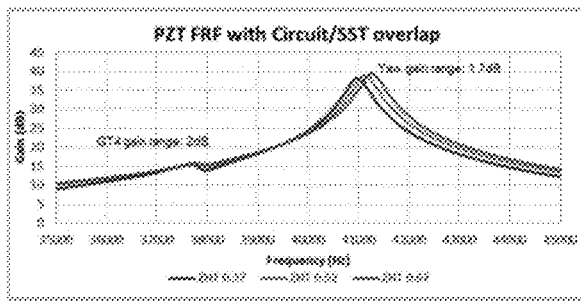
Figure 9E:
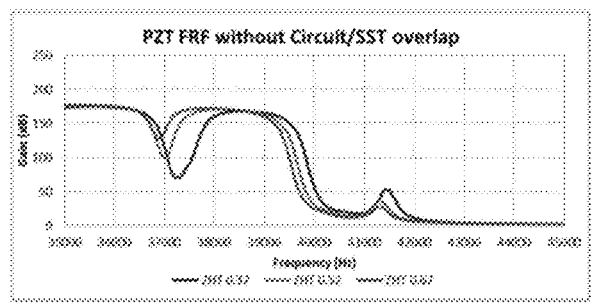
Figure 9F:
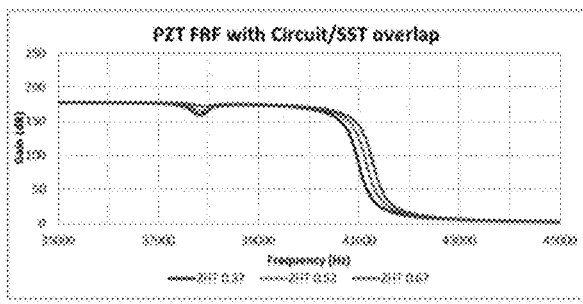
Figure 10:
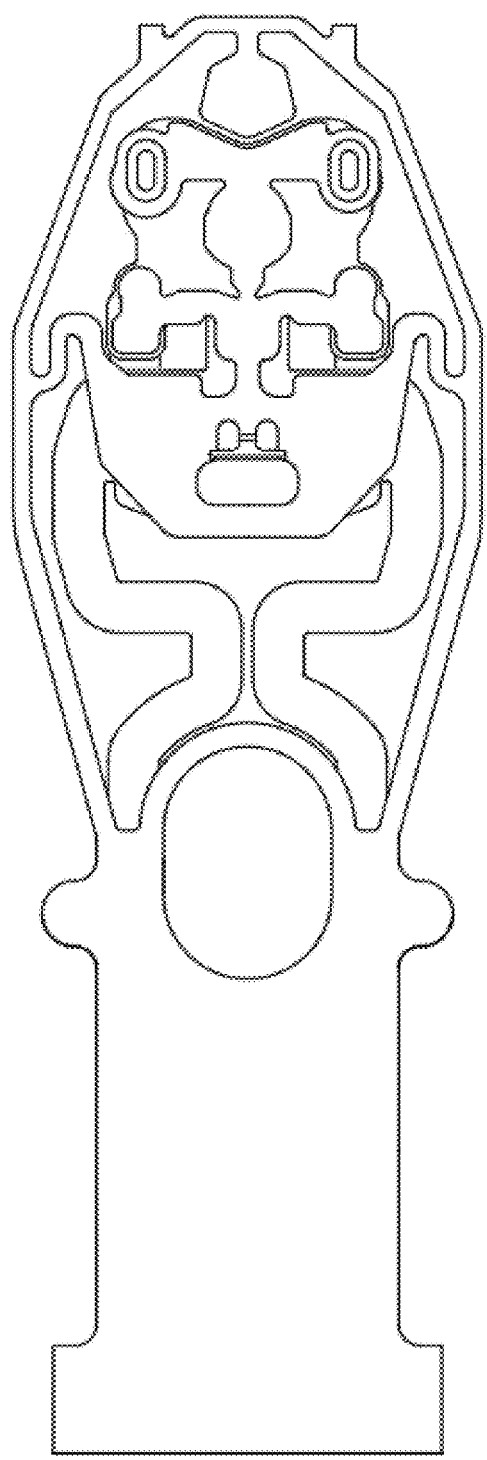
FIG. 10 is a bottom plan view of the suspension flexure of FIG. 3.
Figure 11:
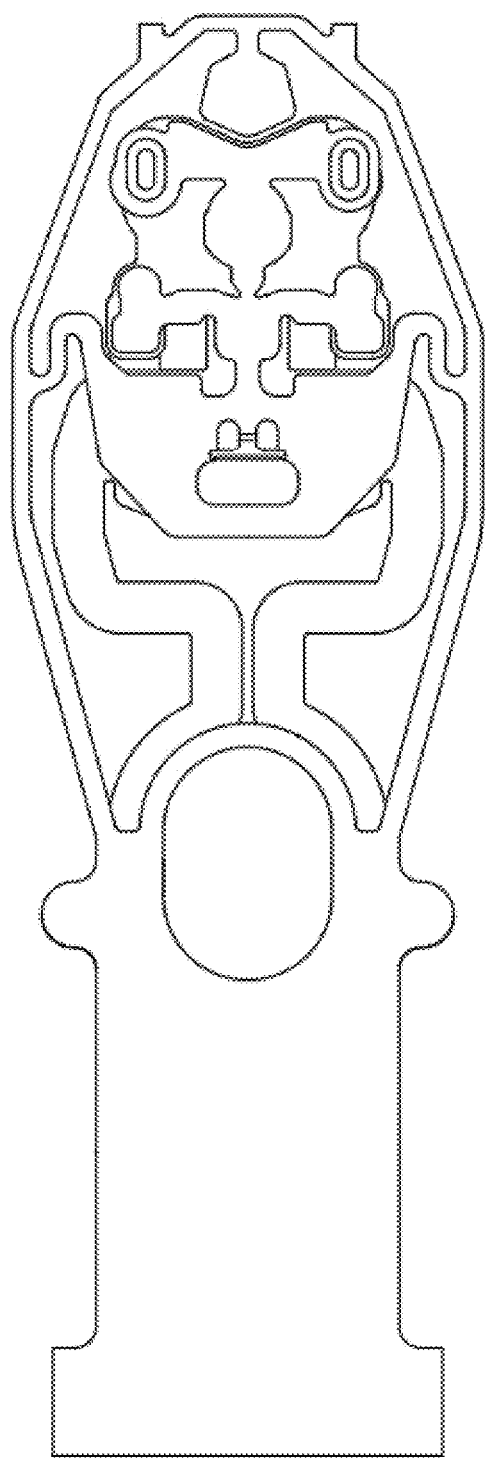
FIG. 11 is a bottom plan view of the suspension flexure of FIG. 6.

FIGS. 9A-9F illustrate graphs of the PZT frequency response function of a suspension according to an embodiment such as illustrated in FIG. 3 compared to the suspension according to an embodiment such as illustrated in FIG. 6. As illustrated in FIGS. 9C and 9D, the suspension that does not incorporate the overlap of the conductive traces and the oblong circular feature exhibited a gain range of 18 dB, compared to 2 dB for the suspension with the conductive trace and oblong circular feature overlap. Furthermore, the suspension that does not incorporate the overlap of the conductive traces and the oblong circular feature exhibited a yaw gain range of 3 dB, compared to 1.7 dB for the suspension with the conductive trace and oblong circular feature overlap. The corresponding phase plot in FIGS. 9E and 9F similarly illustrate the high order gimbal torsion has a smaller phase angle range.

It will be understood that the terms "generally," "approximately," "about," "substantially," and "coplanar" as used within the specification and the claims herein allow for a certain amount of variation from any exact dimensions, measurements, and arrangements, and that those terms should be understood within the context of the description and operation of the present disclosure.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "example" as used herein should not be construed to mean that only a single example having a single essential element or group of elements is presented. Similarly, it will also be appreciated that the term "present disclosure" encompasses a number of separate innovations which can each be considered separate examples. Although the present disclosure has thus been described in detail with regard to the preferred examples and drawings thereof, it should be apparent to those skilled in the art that various adaptations and modifications of the present disclosure may be accomplished without departing from the spirit and the scope of the present disclosure. Accordingly, it is to be understood that the detailed description and the accompanying drawings as set forth hereinabove are not intended to limit the breadth of the present disclosure, which should be inferred only from the following claims and their appropriately construed legal equivalents.

We claim:

1. A flexure comprising:
   a plurality of conductive traces extending from a proximal end of the flexure to a distal end of the flexure;
   a plurality of outer gimbal struts configured to define an opening at the proximal end of the flexure;
   an oblong circular feature extending into the opening, the oblong circular feature defines an aperture; and
   the plurality of conductive traces include a first semicircular conductive trace portion overlapping a first section of the oblong circular feature at a proximal end of the aperture extending to a distal end of the aperture, and
   the plurality of conductive traces include a second semicircular conductive trace portion overlapping a second section of the oblong circular feature at a proximal end of the aperture extending to the distal end of the aperture.

2. The flexure of claim 1, wherein each outer gimbal strut is connected to a bridge strut, the bridge strut configured to provide support to a portion of the plurality of conductive traces.

3. The flexure of claim 1, wherein the second section of the oblong circular feature is opposite the first section of the oblong circular feature.

4. The flexure of claim 1, wherein the plurality of conductive traces includes integrated electrical leads formed of copper.

5. The flexure of claim 1, wherein the plurality of conductive traces include a first insulating material layer, signal conductors on the first insulating material layer, and an insulating and protective covercoat layer over the signal conductors.

6. The flexure of claim 1, further comprising a base formed of stainless steel.

7. The flexure of claim 6, wherein the oblong circular feature is a part of the base.

8. The flexure of claim 6, wherein the plurality of conductive traces are insulated from the stainless steel using a dielectric layer.

9. The flexure of claim 1, comprising a head slider at a slider tongue.

10. The flexure of claim 9, wherein the plurality of conductive traces and the oblong circular feature are configured as a reinforced support structure for the head slider at the slider tongue.

11. A suspension comprising:
    a flexure comprising:
    a plurality of conductive traces extending from a proximal end of the flexure to a distal end of the flexure;
    a plurality of outer gimbal struts configured to define an opening at the proximal end of the flexure;
    an oblong circular feature extending into the opening, the oblong circular feature defines an aperture; and
    the plurality of conductive traces include a first semicircular conductive trace portion overlapping a first section of the oblong circular feature at a proximal end of the aperture extending to a distal end of the aperture, and
    the plurality of conductive traces include a second semicircular conductive trace portion overlapping a second section of the oblong circular feature at a proximal end of the aperture extending to the distal end of the aperture.

12. The suspension of claim 11, wherein each outer gimbal strut is connected to a bridge strut, the bridge strut configured to provide support to a portion of the plurality of conductive traces.

13. The suspension of claim 11, wherein the second section of the oblong circular feature is opposite the first section of the oblong circular feature.

14. The suspension of claim 11, wherein the plurality of conductive traces includes integrated electrical leads formed of copper.

15. The suspension of claim 11, wherein the plurality of conductive traces include a first insulating material layer, signal conductors on the first insulating material layer, and an insulating and protective covercoat layer over the signal conductors.

16. The suspension of claim 11, wherein the flexure includes a base formed of stainless steel.

17. The suspension of claim 16, wherein the oblong circular feature is a part of the base.

18. The suspension of claim 16, wherein the plurality of conductive traces are insulated from the stainless steel using a dielectric layer.

19. The suspension of claim 11, further comprising a head slider at a slider tongue.

20. The suspension of claim 19, wherein the plurality of conductive traces and the oblong circular feature provide a reinforced support structure for the head slider at the slider tongue.

21. The suspension of claim 11, further comprising:
    a base plate;
    a load beam; and the flexure being affixed to the load beam and configured to attach a magnetic read/write head slider to a gimbaled portion of flexure.

\* \* \* \* \*